(12) United States Patent
Piccolo et al.

(10) Patent No.: US 12,467,207 B2
(45) Date of Patent: Nov. 11, 2025

(54) SELECTIVE DOUBLE LAYER MOULDING PROCESS AND APPARATUS

(71) Applicant: FTT S.R.L., Verona (IT)

(72) Inventors: Diego Piccolo, Sarmego (IT); Alex Marangoni, Mezzane di Sotto (IT)

(73) Assignee: FTT S.R.L., Verona (IT)

( * ) Notice: Subject to any disclaimer, the term of this patent is extended or adjusted under 35 U.S.C. 154(b) by 336 days.

(21) Appl. No.: 18/044,449

(22) PCT Filed: May 26, 2022

(86) PCT No.: PCT/EP2022/064364
§ 371 (c)(1),
(2) Date: Mar. 8, 2023

(87) PCT Pub. No.: WO2022/248643
PCT Pub. Date: Dec. 1, 2022

(65) Prior Publication Data
US 2023/0323607 A1    Oct. 12, 2023

(30) Foreign Application Priority Data

May 27, 2021 (EP) .................... 21176321

(51) Int. Cl.
*D21J 5/00* (2006.01)
*D21J 7/00* (2006.01)
*D21J 3/10* (2006.01)

(52) U.S. Cl.
CPC . *D21J 5/00* (2013.01); *D21J 7/00* (2013.01); *D21J 3/10* (2013.01)

(58) Field of Classification Search
CPC ........ D21J 5/00; D21J 7/00; D21J 3/10; D21J 3/00
See application file for complete search history.

(56) References Cited

U.S. PATENT DOCUMENTS

| | | | | |
|---|---|---|---|---|
| 2,637,479 A | * | 5/1953 | Cox | B65D 85/324 206/521.1 |
| 3,990,940 A | * | 11/1976 | Lee | D21J 7/00 162/227 |
| 2005/0150624 A1 | * | 7/2005 | Toh | D21B 1/00 162/224 |
| 2016/0362845 A1 | | 12/2016 | Kuo et al. | |

(Continued)

FOREIGN PATENT DOCUMENTS

| | | | |
|---|---|---|---|
| CN | 108058446 A | * | 5/2018 |
| CN | 108517724 A | * | 9/2018 |

(Continued)

OTHER PUBLICATIONS

International Search Report and Written Opinion for Corresponding International Application No. PCT/EP2022/064364, 8 pages, Sep. 16, 2022.

*Primary Examiner* — Jose A Fortuna
(74) *Attorney, Agent, or Firm* — LUCAS & MERCANTI, LLP

(57) ABSTRACT

The present invention relates to a moulding process. In particular it relates to an improved double layer moulding process allowing to deposit, in a selective and localized way, an additional cellulose layer only in the points detected as critical, with the purpose of increasing the mechanical and aesthetical features thereof.

5 Claims, 10 Drawing Sheets

(56) References Cited

U.S. PATENT DOCUMENTS

| | | | |
|---|---|---|---|
| 2019/0284764 A1 | 9/2019 | Kuo et al. | |
| 2023/0323607 A1* | 10/2023 | Piccolo | D21J 3/00 162/382 |
| 2024/0167230 A1* | 5/2024 | Ishii | D21H 15/02 |

FOREIGN PATENT DOCUMENTS

| | | | | |
|---|---|---|---|---|
| CN | 116901314 A | * | 10/2023 | ......... B29C 33/3814 |
| EP | 4095311 A1 | * | 11/2022 | ................ D21J 3/00 |
| EP | 4382668 A1 | * | 6/2024 | ................ B65D 1/00 |
| JP | 2024519630 A | * | 5/2024 | ................ D21J 7/00 |
| WO | 2021071870 A1 | | 4/2021 | |

* cited by examiner

SELECTIVE DOUBLE LAYER MOULDING PROCESS AND APPARATUS

CROSS-REFERENCE TO RELATED APPLICATIONS

This application is a 371 of PCT/EP2022/064364, filed May 26, 2022, which claims the benefit of priority from European Patent Application No. 21176321.4, filed May 27, 2021.

FIELD OF THE INVENTION

The present invention relates to a moulding process. In particular it relates to an improved double layer moulding process.

BACKGROUND OF THE INVENTION

To date, double layer thermoforming is used for the production of two-layer products, typically in the food sector, with the purpose of minimizing the content of raw material and chemical products and of concentrating them exclusively in the layer in contact with the food products, thus being within the limits provided by the International bodies for the release of compostability certifications and obviously by complying with the dietary prerequisites.

The products deriving therefrom are formed, due to their whole surface extension, by two complete layers, made of in case different materials.

US20190284764 relates to the technical field of an automatic-control wet-fiber paper molding, and more particularly, is related to an automatic-control wet paper molding machine and a method for performing the same.

CN108517724A relates to a pulp molding apparatus, and more particularly to an integrated pulp molding apparatus and method.

However, this leaves open a series of questions, for example linked to the waste of resources and of material, when it is not necessary to provide the double layer for the whole extension of the product itself.

Moreover, evidently, the products currently in use do not allow a high flexibility of application and of personalization of the product, both in structural and aesthetical terms.

SUMMARY OF THE INVENTION

Therefore, the object of the present invention is to solve the problems still left open by the known art and this is obtained through a moulding process, as described herein.

The present invention further relates to an apparatus for moulding, description provided herein.

Additional features of the subject invention device are set forth in the description provided herein.

The present invention, by overcoming the problems of known art, involves several and evident advantages.

First of all, the peculiar production technology according to the invention, is capable of implementing products consisting of two independent and different layers, for example made of cellulose, joined together in one single moulding process, with features definable through the productive cycle and specific for each layer.

The productive process allows to drive the application of the reinforcement layer only where it is considered appropriate to the purpose of the improvement of the mechanical or aesthetical features, thus minimizing the waste of raw material and energy.

The object is reached by devising moulds with moulding and pressing units specific for each type of product, so as to create a functional coupling useful to respond to the technological design requests.

This allows to implement products with high technological content, by guaranteeing performances ever closer to the products made of plastic material made of other productive methods.

Moreover, the technology according to the invention allows the technological differentiation of the two layers, by giving them independent structural and aesthetical properties, such as the mechanical resistance, the level of surface roughness and colouring, by making the implemented products unique on the market, even for use not strictly dedicated for food packaging.

BRIEF DESCRIPTION OF THE DRAWINGS

These and other advantages, together with the features and use modes of the present invention, will result evident from the following detailed description of preferred embodiments thereof will result evident from the following detailed description of preferred embodiments thereof, shown by way of example and not with limitative purposes, by making reference to the figures

DETAILED DESCRIPTION OF THE INVENTION

The present invention will be described in details hereinafter by referring to the above-mentioned figures.

According to the invention, in general terms, the use of an improved double layer moulding technology is provided to deposit, in a selective and localized way, an additional cellulose layer only in the points detected as critical for the specific product. The coupling of two layers can generate, based upon the product technological requests, different mechanical features: increase in the specific density and increase in the thickness with relative increases in the structural resistances.

Starting from this concept, it was thought to use a targeted deposition of a cellulose layer (reinforcement layer) only in determined points of the product during implementation by means of a single moulding process.

The raw materials used for the production of the two layers are preferably, but not limitedly, mixtures of fibres of cellulose of vegetable origin, extracted through processes commonly known in the paper technique, then mechanical or chemical or half-chemical pastes.

To the purpose even a selective double layer moulding apparatus was devised.

Figure 1:
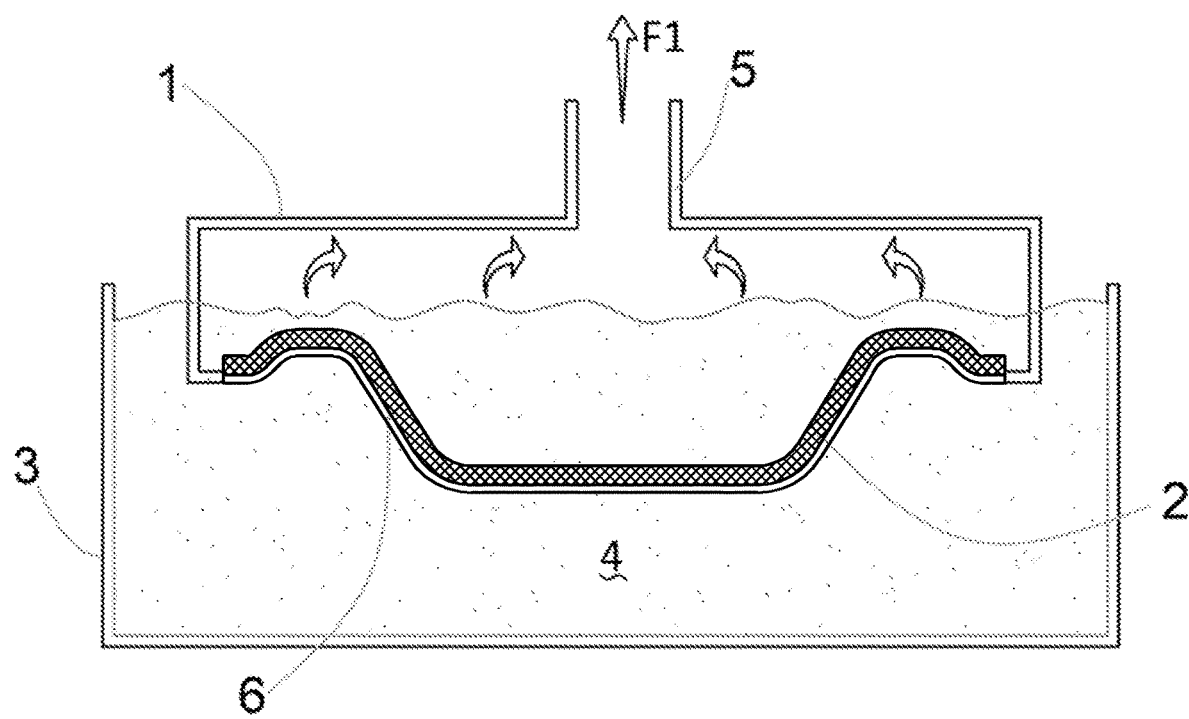
FIGS. 1 to 3 show some components of an apparatus according to the present invention and illustrate some phases of a process according to the present invention, for the preparation of a preform.

By firstly making reference to FIG. 1, this illustrates the first phases of a process according to the present invention, performed with an apparatus according to the invention.

In particular, a tank 3 suitable to contain cellulose pulp 4 is provided. Preferably, the cellulose pulp has a consistency between 0.3% and 0.8%, verified through suitable dilution control. The consistency is the percentage of solid contents (fibres) inside the bath. Through a micro-wave transmitter, a check and in case an adjustment of the mix concentration can be performed, before being input into the tank.

A first counter-mould of external moulding 1 has a porous functional face 2, for example a net-like face, having the profile of the product to be implemented. The first moulding counter-mould 1 is then dipped into the tank 3, so that the net-like face 2 is dipped in the cellulose pulp 4.

It is to be meant that the apparatus according to the invention comprises actuation means for moving moulds and counter-moulds.

The first moulding counter-mould 1 has a hollow shape and it comprises a sleeve 5 connecting with the external environment.

According to the invention, a suction is applied through the sleeve 5 (arrow F1 in FIG. 1). For example, through a pump with liquid ring, vacuum up to about 33 mbar is generated.

In this way, through the sleeve 5 and the net-like face 2, the cellulose pulp 4 is sucked, the fibres thereof deposit on the net 2 by forming a humid layer 6. The first moulding counter-mould 1 is left dipped into the tank 3, with the applied vacuum, for a predefined suction time T1. The suction time is set in function of the wished weight for the final product, typically between 100 and 800 g/m². The time T1 can vary even based upon the type of used fibre and upon the bath consistency. Preferably, for the designated weights, T1 is comprised between 0.1 and 10 seconds.

Advantageously, the dilution water is sucked with the vacuum flow and separated to be used in the subsequent productive cycles.

Once the suction time T1 has elapsed, the first moulding counter-mould 1 is extracted from the bath. Preferably the suction through the sleeve 5 remains active during this phase, and even when the first moulding counter-mould 1 is outside the tank 3, no more dipped into the cellulose pulp. In this way a first preform dehydration is implemented. This dehydration phase lasts for a predefined dehydration time T2, set so as to obtain, in the end, a dry level comprised between 20% and 30% by weight of solid content. The time T2 can vary even depending upon the cycle time. Preferably, a minimum dehydration time of 3 seconds and a maximum dehydration time of 20 seconds are considered.

Figure 2:
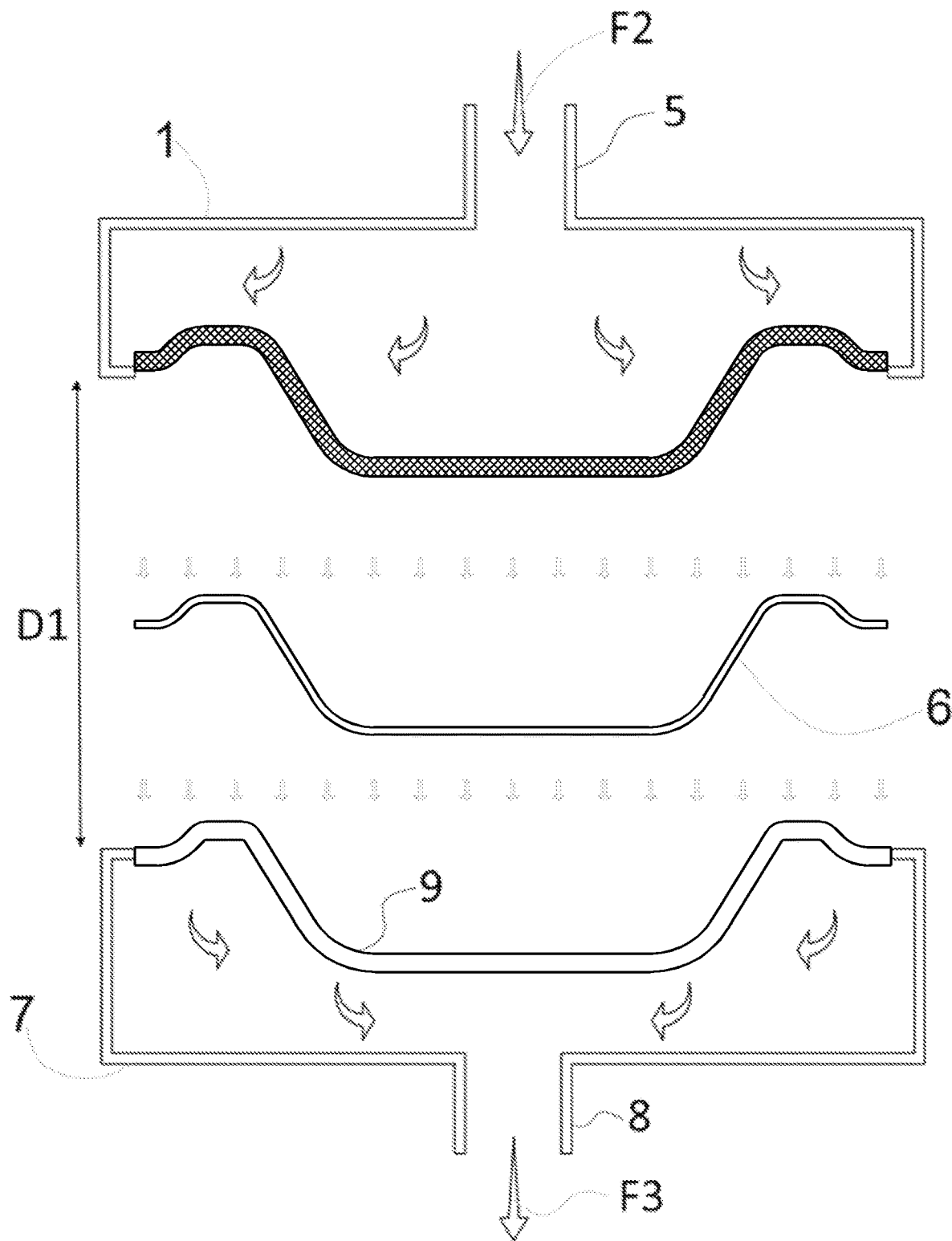

The subsequent FIG. 2 relates to a subsequent phase of the process according to the invention.

The first moulding counter-mould 1 is then approached to a thermoforming mould 7. The thermoforming mould 7 is preferably hollow and equipped with a sleeve 8 connecting with the external environment.

Moreover, preferably, the thermoforming mould 7 has a net-like face 9 shaped with a concavity so as to be able to receive the preform 6.

The first moulding counter-mould 1 and the thermoforming mould 7 are then positioned in axis, at a distance D1, determined depending upon the object geometry and upon the thickness of the humid layer, for example comprised between 0 and 2 mm. The distance D1 however is set so that the pulp deposit takes place in a correct and uniform way for the whole extension of the preform 6 and so that the humid pulp is not dragged, due to a sliding effect, between possible walls (or portions of walls) of the moulds which are not exactly orthogonal to the approaching direction of the moulds themselves.

At this point, the suction is interrupted through the sleeve 5 of the first moulding counter-mould 1 and, still through the sleeve 5, compressed air is introduced (arrow F2 in FIG. 2).

At the same time, vacuum can be applied to the sleeve 8 of the thermoforming mould 7, by generating a suction flow (arrow F3 in FIG. 2).

Figure 3:
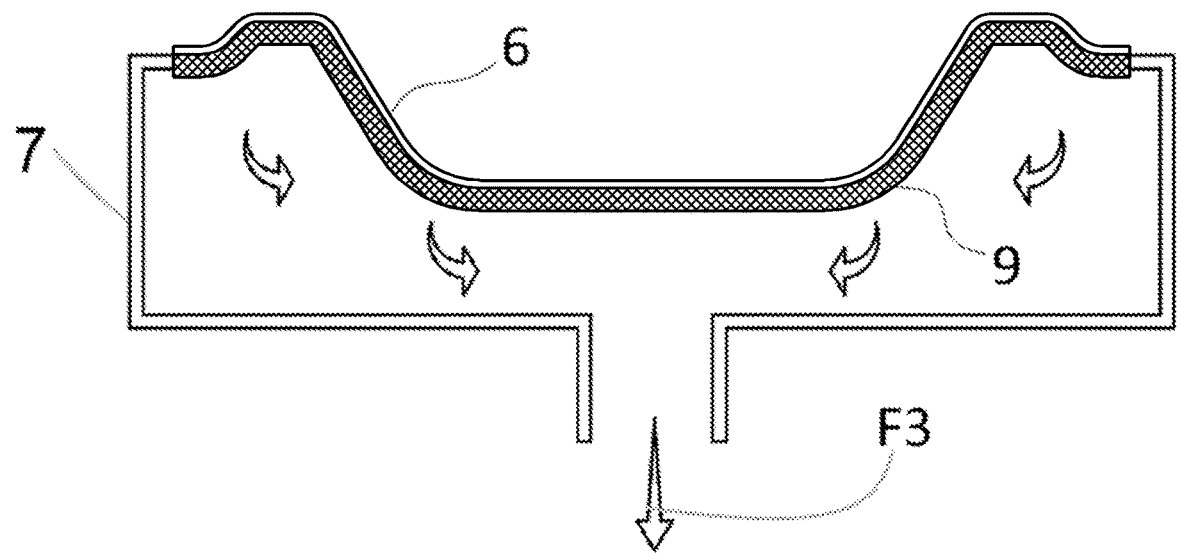

The action of the flow of compressed air F2 and/or of the suction flow F3 causes the detachment of the humid preform 6 from the first moulding counter-mould 1 and its positioning on the net-like face 9 of the thermoforming mould 7, as shown in FIG. 3.

Figure 4:
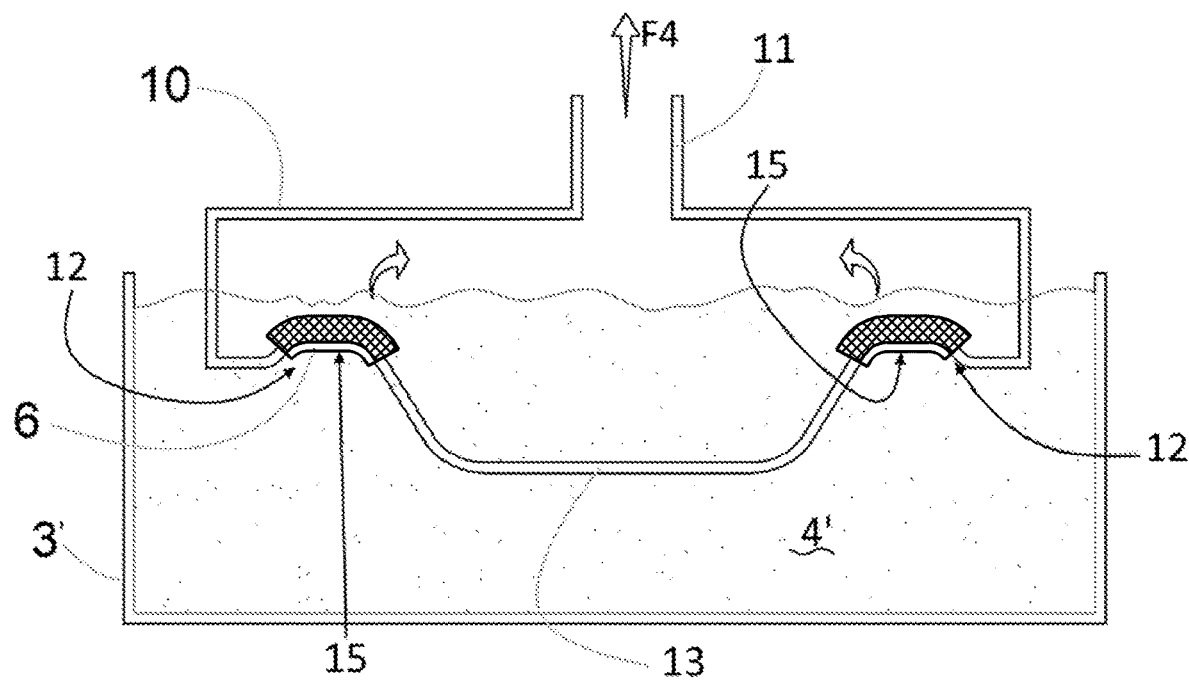
FIGS. 4 to 6 show some components of an apparatus according to the present invention and illustrate some phases of a process according to the present invention, for the preparation of a reinforcement layer.

By now referring to FIG. 4, this shows a subsequent phase of the process, to implement a reinforcement layer 15.

According to the invention the moulding apparatus comprises a second moulding counter-mould 10.

The second moulding counter-mould 10 is preferably hollow and comprises a sleeve 11 for connecting with the external environment.

The second moulding counter-mould 10 has a functional face shaped according to the product to be implemented. On such face porous areas 12 are present, for example implemented like a net, and not porous areas 13.

The positioning, the number and the extension and the distribution of the porous areas 12 is determined by the type of product which one wants to implement and correspond to reinforcement regions of the finished product.

The second moulding counter-mould 10 is positioned in a second tank 3' with the functional face dipped in a bath of cellulose pulp 4', with a concentration which can vary between 0.3% and 0.8%.

With the purpose of giving different properties to the two layers it is in case possible, and sometimes preferable, that the cellulose pulp 4' has different features from the pulp 4 used for implementing the preform 6. The differentiation of the two mixes for the supporting layer and the reinforcement layer makes further possible to dose chemical additives, colours and mineral charges selectively in one layer or into the other one.

By way of example, an implementation of the reinforcement layer could be provided therefor the selection of the raw materials falls on fibres with greater length (with respect to those used for the supporting layer 6) and usually more refined mixes. In fact, this allows to economize on the supporting layer from the point of view of raw materials (considering the lower cost of the short fibres) and processing (the fact of refining a little involves consuming a less amount of energy), but to guarantee at the same time optimum mechanical performances thanks to the function of the reinforcement layer.

The tank 3', for practical reasons, preferably will be a different and additional tank with respect to the tank 3. However, it is to be meant that, alternatively, the same tank could be used, after replacing the content.

According to the invention, a suction is applied through the sleeve 11 (arrow F4 in FIG. 4). For example, through a liquid ring pump, vacuum up to about 33 mbar is generated.

In this way, through the sleeve 11 and the porous regions 12 of the functional face of the second counter-mould 10, the cellulose pulp 4' is sucked, the fibres thereof deposit on the net of the porous region 12 by forming a humid layer 15.

The second moulding counter-mould 10 is left dipped in the tank 3', with the applied vacuum, for a predefined suction time T3. The suction time is set depending upon the wished weight for the final product, typically between 100 and 800 g/m². The time T3 can vary even based upon the type of used fibre and upon the consistency of the bath. Preferably, for the designated weights, T3 is comprised between 0.1 and 10 seconds.

Advantageously, the dilution water is sucked with the vacuum flow and separated to be used in the subsequent productive cycles.

The results of this phase will be a layer 15—not necessarily unitary and continuous—of humid cellulose fibre formed selectively at the porous areas 12 of the mould 10.

Once the suction time T3 has elapsed, the second moulding counter-mould 10 is extracted from the bath. Preferably the suction through the sleeve 11 remains active during this phase, and even when the second moulding counter-mould 10 is outside the tank 3', no more dipped into the cellulose pulp. In this way a first dehydration of the preform is implemented. This dehydration phase lasts for a predefined dehydration time T4, set so as to obtain, in the end, a dry level comprised between 20% and 30%. The time T4 can vary even depending upon the cycle time. Preferably a minimum dehydration time of 3 seconds and a maximum dehydration time of 20 seconds are considered.

The second moulding counter-mould 10 is then approached to the thermoforming mould 7, whereon the preform 6 from the preceding phase is already positioned.

The second moulding counter-mould 10 and the thermoforming mould 7 are then positioned in axis, at a distance D2, determined depending upon the object geometry and upon the thickness of the wished humid layer, for example comprised between 1 and 3 mm. The distance D2 is however set so that the pulp deposit takes place in a correct and uniform way for the whole extension of the preform 6 and so that the humid pulp is not dragged, due to a sliding effect, between possible walls (or portions of walls) of the moulds which are not exactly orthogonal to the approaching direction of the moulds themselves.

Moreover, the distance D2 has to be so as not to damage the preform 6, for example due to a compression excess.

Figure 5:
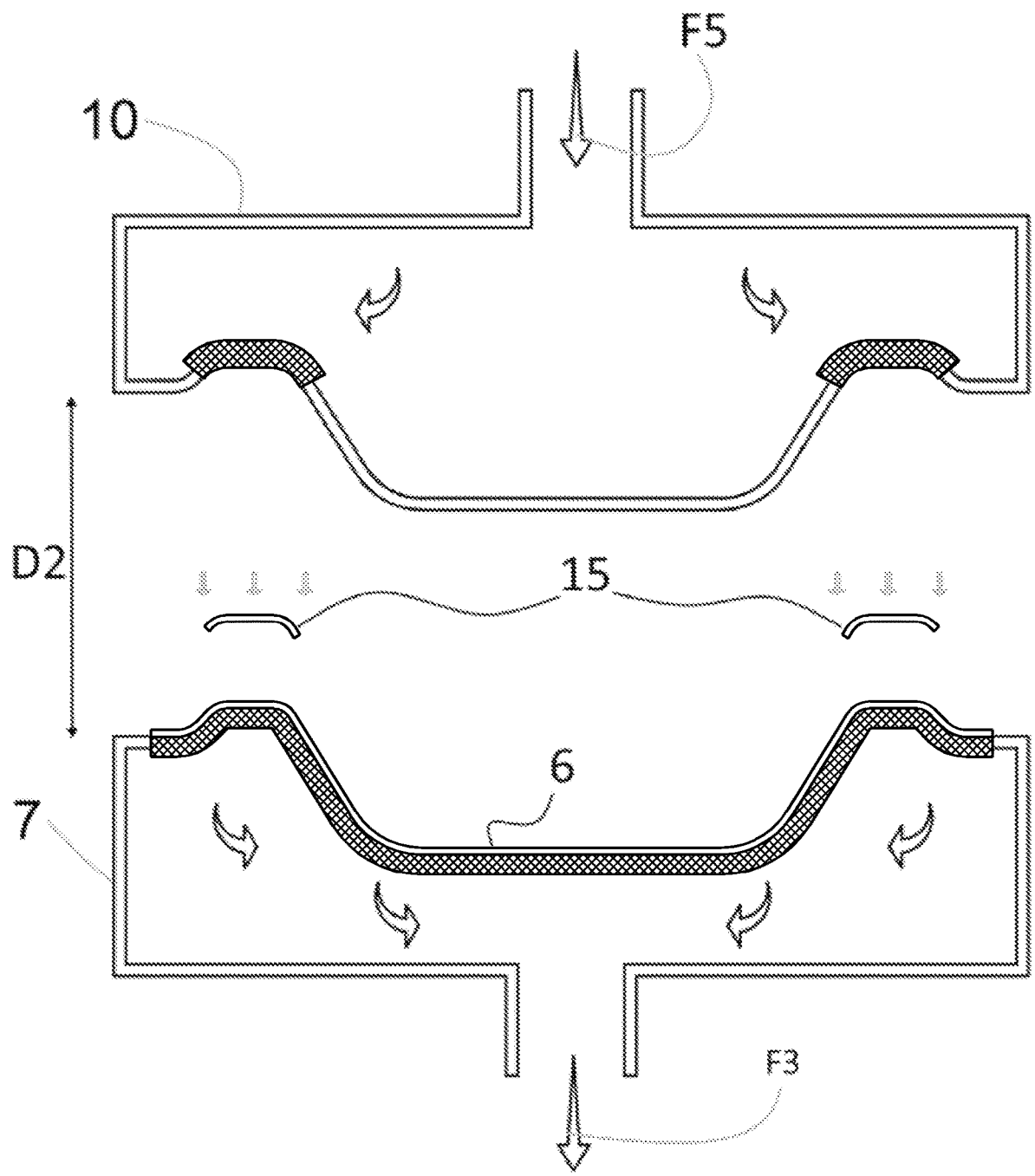

At this point, the suction through the sleeve 11 of the second moulding counter-mould 10 is interrupted and, still through the sleeve 11, compressed air is introduced (arrow F5 in FIG. 5).

At the same time, vacuum can be applied to the sleeve 8 of the thermoforming mould 7, by generating a suction flow (arrow F3 in FIG. 5).

The action of the flow of compressed air F5 and/or of the suction flow F3 causes the detachment of the humid layer 15 from the second moulding counter-mould 10 and its positioning on the preform 6 already positioned on the thermoforming mould 7.

Figure 6:
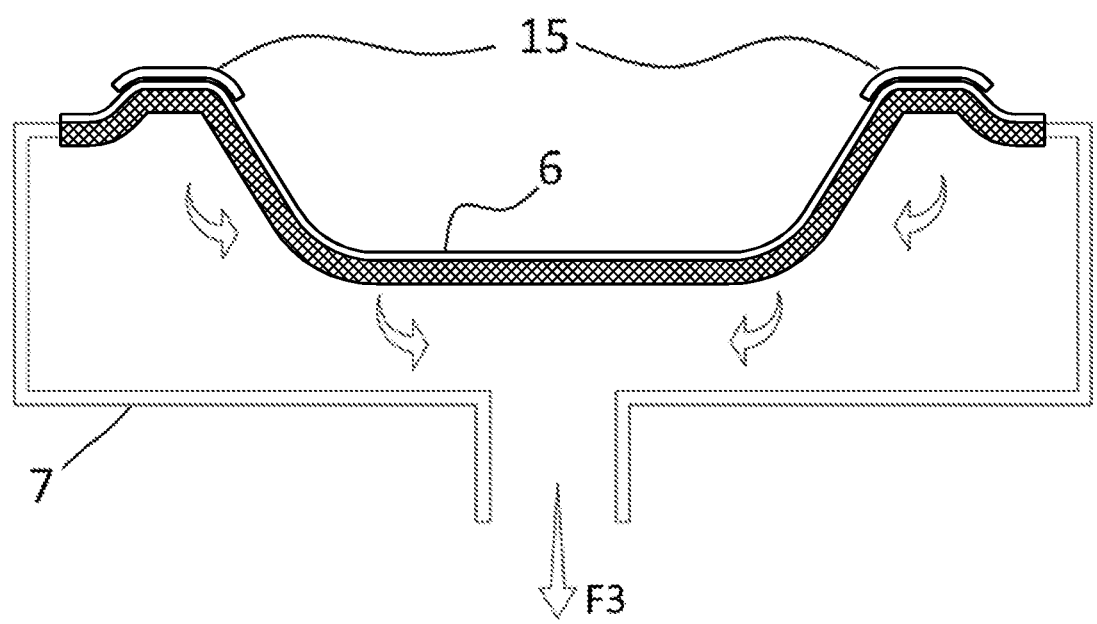

On the thermoforming mould 7 now there are the two humid layers 6 and 15 overlapped as shown in FIG. 6.

Figure 7:
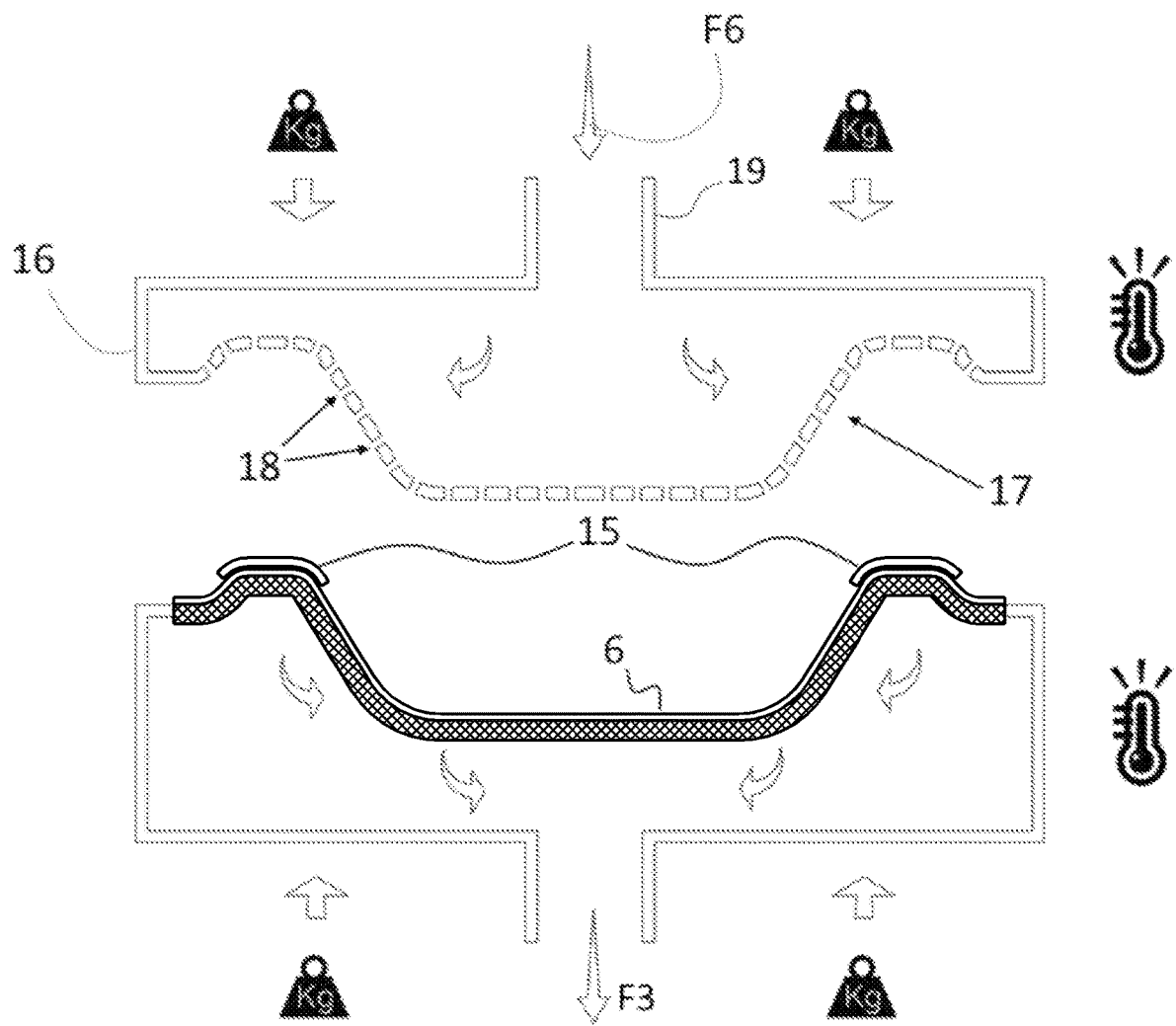
FIG. 7 shows some components of an apparatus according to the present invention and illustrates some phases of a process, according to the present invention, for joining the preform and the reinforcement layer.

Reference is now made to FIG. 7.

The apparatus according to the present invention further comprises a definition mould 16 comprising a functional face 17, shaped so as to adapt to the profile of the product to be implemented, and equipped with through-holes 18. The holes 18 preferably are arranged on the whole extension of the functional face 17.

The definition mould 16 is placed in axis with the thermoforming mould 7 and approached to the latter, thus compressing the set of the two overlaid layers 6 and 15. To the definition mould 16 and to the thermoforming mould 7 a mechanical pressure comprised between 20 and 100 N/cm² is applied.

Moreover, the definition mould 16 and/or the moulding mould 7, can even be heated. To this purpose, the apparatus according to the present invention can include heating means, for example electric heating means, suitable to heat moulds and counter-moulds.

For example, the moulds can be thermo-adjusted at a temperature comprised between 150 and 220° C.

Preferably, to the thermoforming mould 7 vacuum is still applied (arrow F3 in FIG. 7) to remove water and vapour which is generated during these process phases.

Advantageously, to the definition mould 16 an air flow F6 can be applied through the sleeve 19, to ease the preform drying.

This drying phase will be prolonged for a predefined drying time T5, preferably comprised between 8 and 25 seconds, set so as to obtain, in the end, the wished dry level. In case the preform has to be still treated in a second thermoforming station, then it will be preferable to extract it at a dry level comprised between 50 and 75%. On the contrary, if one wishes to produce directly the final product, then the preform could be left to dry until a final dry level comprised between 94 and 96%.

Based upon the process parameter (pressure and temperature) and the shape of the definition mould 16, or in case through treatment in a subsequent thermoforming station with a different specific definition mould, it will be possible to obtain a finished product meeting the wished specification in terms of thickness and density.

Figure 8A:
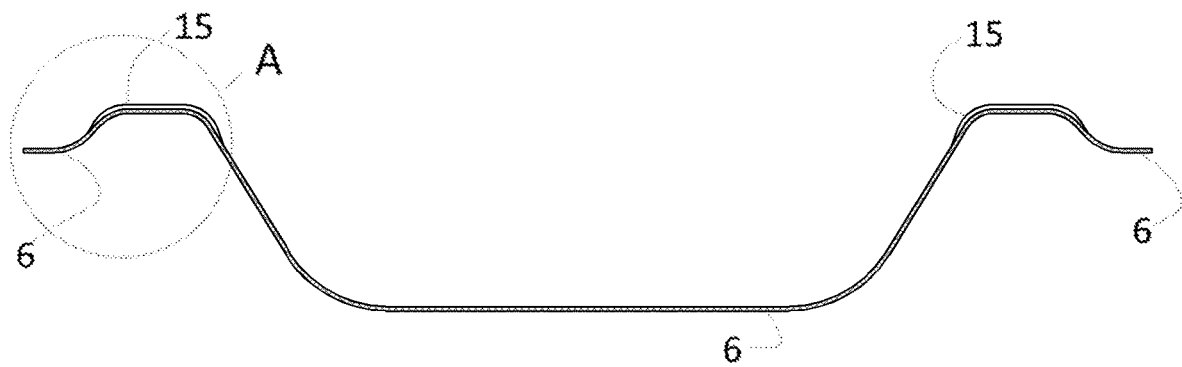
FIGS. 8A and 8B show a product obtained according to the invention according to the variant which provides a distribution of the material with constant density and variable thickness.
Figure 8B:
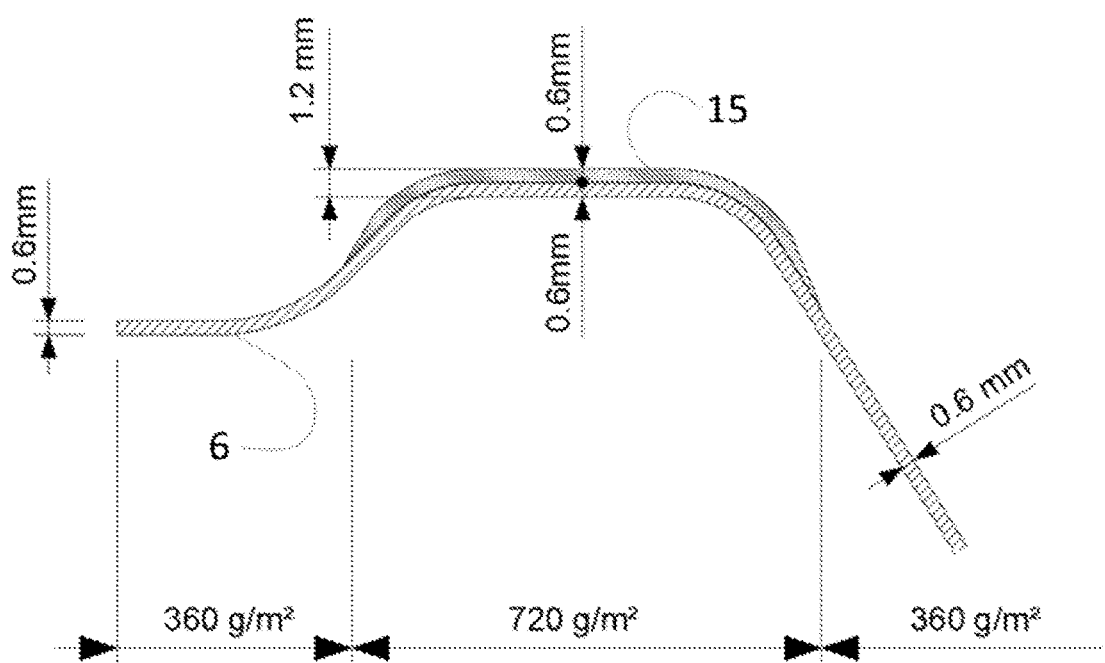

In particular, as shown by way of example in FIGS. 8A and 8B, products with constant density and variably thickness can be implemented. Sizes and parameters designated in the figures are to be considered implementation, not limiting examples.

The definition mould 16 (or in case a subsequently used specific definition mould) is devised with a shape so that, at the minimum approaching distance to the thermoforming mould 7, the gap between the two moulds is variable, for example comprised between 0.3 and 1.5 mm, thus by differentiating the reinforcement regions, thereat one wants to obtain a greater material thickness than the other product areas. The applied mechanical pressure preferably is comprised between 20 and 100 N/cm², more preferably comprised between 40 and 60 N/cm².

The final result is that the layer 6 and the reinforcement layer 15 keep a constant density. Of course, the thickness at the reinforcement areas of the layer 15 will be increased than the thickness of the product in the other points.

With this technology it is possible for example to dedicate a different colour to the two layers during moulding in tank, by obtaining a two-colour product without the need for post-production treatments.

Figure 9A:
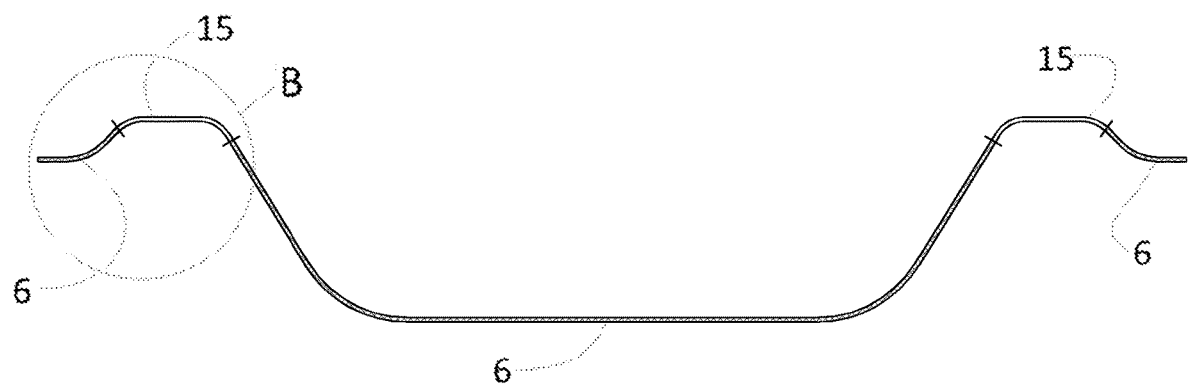
FIGS. 9A and 9B show a product obtained according to the invention according to the variant which provides a distribution of the material with variable density and constant thickness.
Figure 9B:
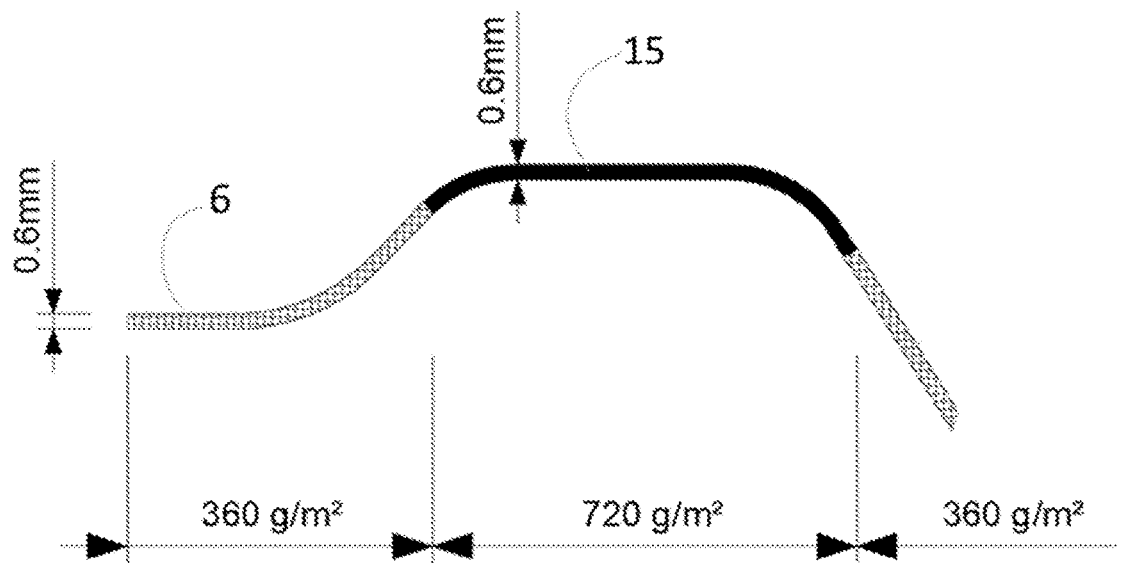

Alternatively, as shown for example in FIGS. 9A and 9B, products with variable density and constant thickness can be implemented. Sizes and parameters shown in figures are to be considered not limiting embodiment examples.

In this case, the definition mould 16 (or in case a subsequently used specific definition mould) is devised with a shape so that, at the minimum approaching distance to the moulding mould 7, the gap between the two moulds is constant, for example comprised between 0.3 and 1 mm, the thickness having to result uniform for the whole extension of the final product. The applied mechanical pressure is preferably comprised between 20 and 100 N/cm$^2$, more preferably comprised between 40 and 60 N/cm$^2$.

The base layer 6 and the reinforcement layer 15 are pressed to keep the thickness constant, then in the reinforcement areas 15 there will be a higher density than the remaining profile.

By varying the material density, a localized mechanical stiffness is obtained without evident exterior signs and a good surface homogeneity of the product.

Figure 10:
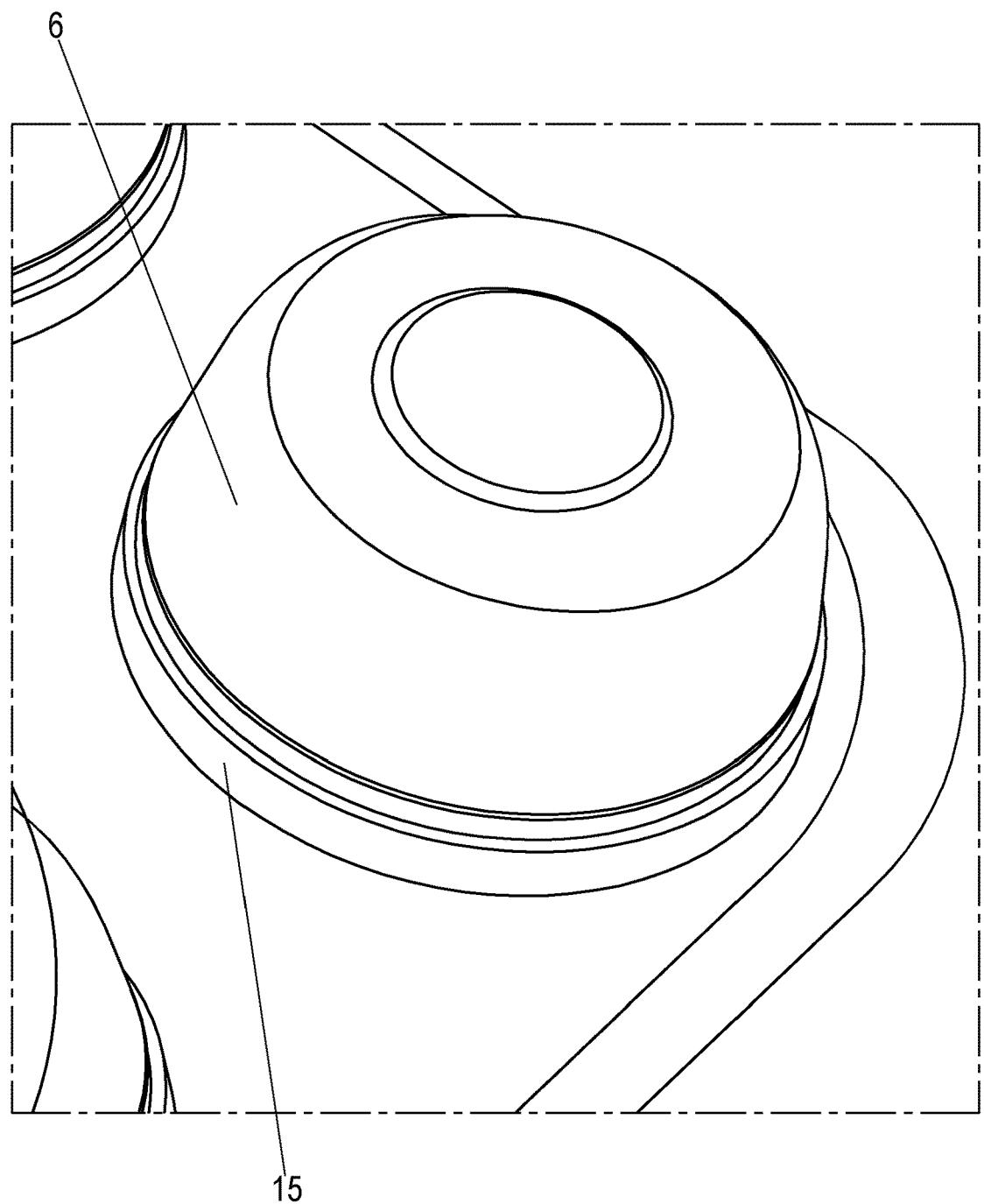
FIG. 10 shows an example of the product obtained according to the invention according to the variant which provides a distribution of the material with variable density and constant thickness.

The subsequent FIG. 10 shows by way of example a product obtained according to the method of the present invention, in the variant which provides a distribution of the material with variable density and constant thickness.

Figure 11:
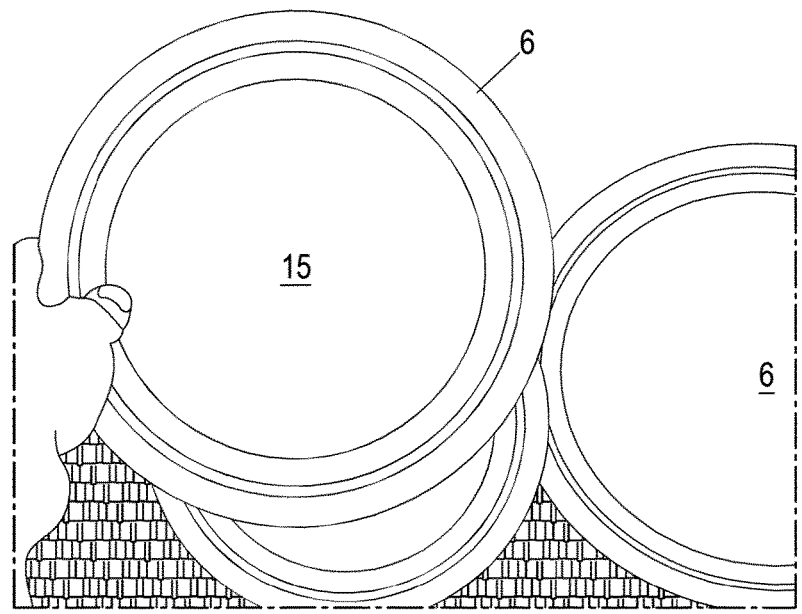
FIGS. 11 and 12 show examples of products obtained according to the invention according to the variant which provides a distribution of the material with constant density and variable thickness.
Figure 12:
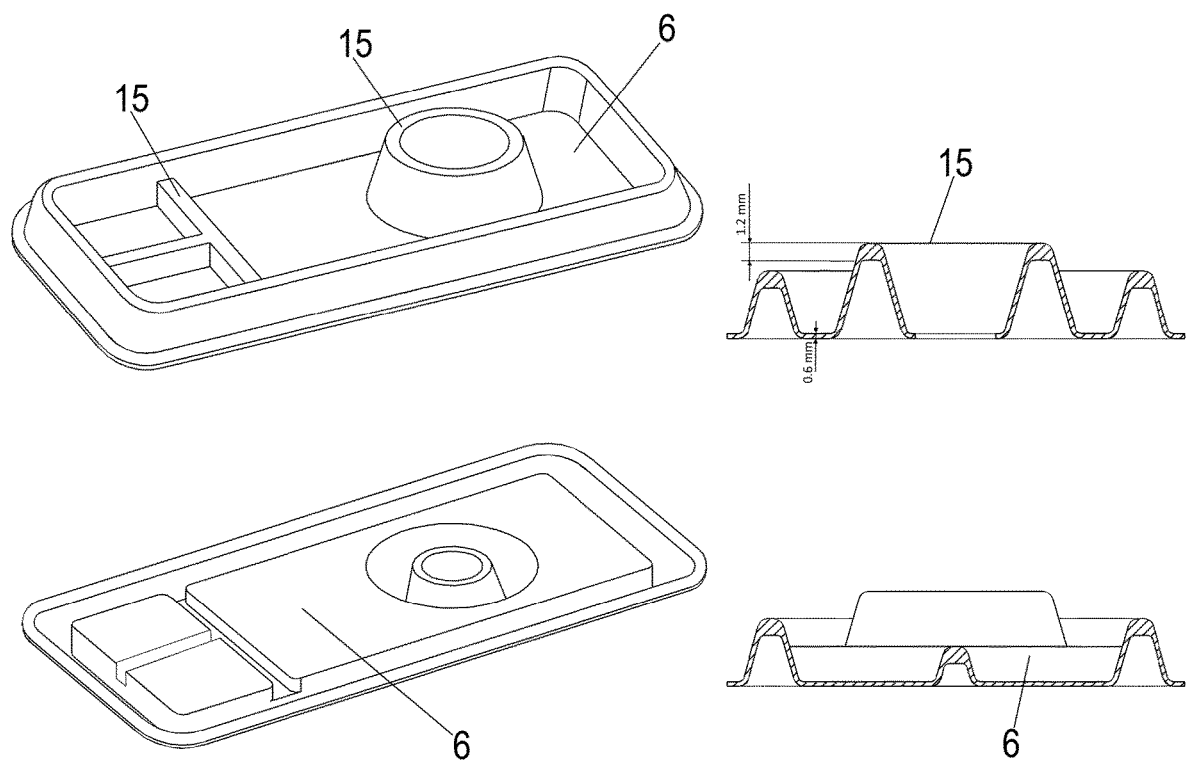

FIGS. 11 and 12 are instead examples of products obtained according to the method of the present invention, in the variant which provides a distribution of the material with constant density and variable thickness.

The present invention has been sofar described with reference to preferred embodiments thereof. It is to be meant that each one of the technical solutions implemented in the preferred embodiments, described herein by way of example, can advantageously be combined, differently from what described, with the other ones, to create additional embodiments, belonging to the same inventive core and however all within the protective scope of the herebelow reported claims.

The invention claimed is:

1. A selective double layer molding process of a product made of cellulose fibers, comprising:
   a) forming, through a first molding counter-mold, a first cellulose layer, to implement a preform of said product;
   b) forming, through a second molding counter-mold, a second cellulose humid layer, implemented by one or more areas, localized in predefined positions, corresponding to reinforcement regions of said product;
   c) overlapping said first layer and said second layer;
   d) joining, through a definition mold and a thermoforming mold, said first layer and said second layer, to obtain said product; and
   d) drying said product,
   wherein said definition mold has a functional face shaped so that, at the minimum approaching distance to the thermoforming mold, the gap between the two molds is variable, so as to obtain as a whole a product with constant density and variable thickness, or said gap is constant so as to obtain as a whole a product with variable density and constant thickness; and
   wherein when the gap is variable, the gap is made to vary so that the thickness of the product is increased at said reinforcement regions.

2. The process according to claim 1, wherein said first humid layer is formed with a dry level of between 20% and 30%.

3. The process according to claim 1, wherein said second humid layer is formed with a dry level of between 20% and 30%.

4. The process according to claim 1, wherein said joining step comprises applying to said definition mold and/or to said thermoforming mold a pressure of between 20 and 100 N/cm$^2$.

5. The process according to claim 1, wherein said joining step comprises applying to said definition mold and/or to said thermoforming mold a heating at a temperature of between 15° and 220° C.

* * * * *